United States Patent
Lee

(10) Patent No.: US 7,112,936 B2
(45) Date of Patent: Sep. 26, 2006

(54) APPARATUS AND METHOD FOR CONTROLLING BRUSHLESS DC MOTOR

(75) Inventor: Kwang-Woon Lee, Goyang (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 348 days.

(21) Appl. No.: 10/636,540

(22) Filed: Aug. 8, 2003

(65) Prior Publication Data

US 2004/0130284 A1 Jul. 8, 2004

(30) Foreign Application Priority Data

Jan. 8, 2003 (KR) ............... 10-2003-0000977

(51) Int. Cl.
*H01R 39/46* (2006.01)
*H02K 13/00* (2006.01)
*H02P 25/13* (2006.01)

(52) U.S. Cl. .................... 318/439; 318/138; 318/254; 318/799; 318/800; 318/801; 318/802; 318/803

(58) Field of Classification Search .............. None
See application file for complete search history.

(56) References Cited

U.S. PATENT DOCUMENTS

| | | | |
|---|---|---|---|
| 4,843,296 A * | 6/1989 | Tanaka | 318/800 |
| 5,534,763 A * | 7/1996 | Williams et al. | 318/799 |
| 5,594,670 A * | 1/1997 | Yamamoto | 702/64 |
| 5,672,944 A | 9/1997 | Gokhale et al. | |
| 5,869,946 A * | 2/1999 | Carobolante | 318/811 |
| 6,153,993 A * | 11/2000 | Oomura et al. | 318/434 |
| 6,900,604 B1 * | 5/2005 | Kokami et al. | 318/254 |
| 2004/0021437 A1 * | 2/2004 | Maslov et al. | 318/254 |

* cited by examiner

*Primary Examiner*—Lincoln Donovan
*Assistant Examiner*—Erick Glass
(74) *Attorney, Agent, or Firm*—Staas & Halsey LLP

(57) ABSTRACT

An apparatus and method for controlling a brushless DC motor, which minimizes a torque ripple thereof, and includes a power converting unit to convert alternating current (AC) power to polyphase AC power and to supply the polyphase AC power to the brushless DC motor. A rotator position/speed detecting unit detects status information of a rotator. A terminal voltage detecting unit detects variations of terminal voltages of the polyphase AC power. A control unit detects phase commutation periods of the polyphase AC power using the status information provided from the rotator position/speed detecting unit and the terminal voltage variation information of the polyphase AC power provided from the terminal voltage detecting unit. The control unit controls the power converting unit to supply a compensation voltage used to constantly maintain a mean voltage of a non-commutation phase of the polyphase AC power during the detected phase commutation periods.

44 Claims, 13 Drawing Sheets

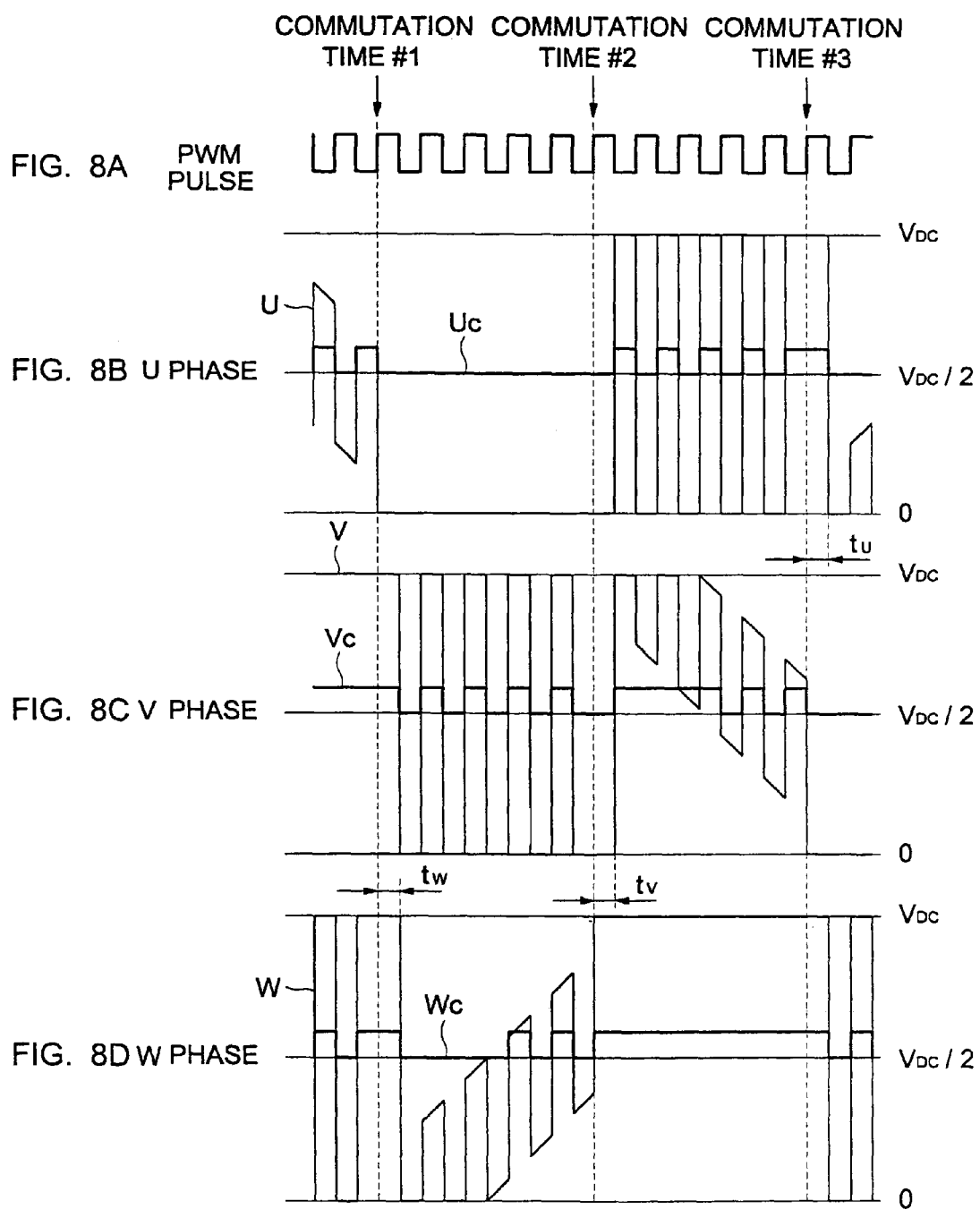

APPARATUS AND METHOD FOR CONTROLLING BRUSHLESS DC MOTOR

CROSS-REFERENCE TO RELATED APPLICATION

This application claims the benefit of Korean Patent Application No. 2003-977, filed Jan. 8, 2003, in the Korean Intellectual Property Office, the disclosure of which is incorporated herein by reference.

BACKGROUND OF THE INVENTION

1. Field of the Invention

The present invention relates, in general, to an apparatus and method for controlling motors and, more particularly, to an apparatus and method for controlling a brushless direct current motor, which minimizes torque ripple.

2. Description of the Related Art

As is well known to those skilled in the art, a brushless Direct Current (DC) motor employs a rectifying circuit including switching devices instead of mechanical elements, such as a brush and a commutator. The brushless DC motor is characterized in that the replacement of the brush due to abrasion is not necessary, and little electromagnetic interference and drive noise exist. A control apparatus driving the brushless DC motor is described in detail with reference to FIG. 1.

FIG. 1 is a block diagram of a conventional apparatus to control a brushless DC motor. As shown in FIG. 1, a power converting device including a converter 104, a capacitor 108 and an inverter 106 converts Alternating Current (AC) power supplied from an AC power supply unit 102 to pulse-shaped 3-phase AC power, and supplies the 3-phase AC power to a brushless DC motor (BLDC motor) 110. Of U, V and W phase currents of the 3-phase AC power supplied to the brushless DC motor 110 from the inverter 106, U and V phase currents are detected by first and second current sensors 112a and 112b. The U and V phase current information detected by the first and second current sensors 112a and 112b, respectively, is provided to a control unit 114 and inverter control signals provided to the inverter 106 are based on the detected U and V phase current information. A position and a speed of a rotator of the brushless DC motor 110 are detected by a position/speed detecting unit 116. The detected position/speed information of the rotator is further provided to the control unit 114 and inverter control signals provided to the inverter 106 are based on the detected position/speed information. That is, the control unit 114 controls the speed of rotation of the brushless DC motor 110 with reference to the phase current information inputted from the current sensors 112a and 112b and the rotator position/speed information inputted from the position/speed detecting unit 116. The control unit 114 outputs inverter control signals to control phase commutation times of the 3-phase AC power outputted from the inverter 106 and the intensities of phase currents thereof, thus allowing the rotation speed of the brushless DC motor 110 to comply with a speed command.

Torque of the brushless DC motor may be expressed by the multiplication of an induced voltage by a current. In phase commutation periods of the 3-phase AC power, phase currents are temporarily decreased, thus generating torque ripple. Since the torque ripple is a cause of noise generation and vibration, a plan to minimize the torque ripple is required.

To minimize the torque ripple of the brushless DC motor, phase currents temporarily reduced during the phase commutation periods must be provided with compensation. The compensation must be performed only during the phase commutation periods. If the phase commutation periods are not accurately detected, undercompensation or overcompensation of the phase currents occurs. Accordingly, to minimize the torque ripple, accurately detecting the phase commutation periods is important. In the related art, current sensors, such as hall effect sensors, are used to detect the phase commutation periods of the brushless DC motor. However, using the current sensors to detect respective phase currents, as shown in FIG. 1, increases a manufacturing cost of a brushless DC motor control apparatus, thereby imposing a heavy burden to both a manufacturer and a user.

SUMMARY OF THE INVENTION

Accordingly, it is an aspect of the present invention to provide an apparatus and method for controlling a brushless direct current (DC) motor, which accurately detects phase commutation times and periods of 3-phase AC power and compensates for a reduction of currents occurring during the detected phase commutation periods so as to minimize torque ripple due to a temporary reduction of phase currents occurring during the phase commutation periods of 3-phase currents supplied to the brushless DC motor.

Additional aspects and/or advantages of the invention will be set forth in part in the description which follows and, in part, will be obvious from the description, or may be learned by practice of the invention.

The above and/or other aspects are achieved by providing an apparatus for controlling a brushless direct current DC motor, including a power converting unit to convert commercial alternating current (AC) power to polyphase AC power and supply the polyphase AC power to the brushless DC motor. A rotator position/speed detecting unit detects status information of a rotator of the brushless DC motor. A terminal voltage detecting unit detects variations of terminal voltages of the polyphase AC power supplied to the brushless DC motor. A control unit detects phase commutation periods of the polyphase AC power using the status information of the rotator provided from the rotator position/speed detecting unit and the terminal voltage variation information of the polyphase AC power provided from the terminal voltage detecting unit. Further, the control unit controls the power converting unit to supply to the brushless DC motor a compensation voltage used to constantly maintain a mean voltage of a non-commutation phase of the polyphase AC power during the detected phase commutation periods.

The above and/or other aspects are achieved by a method of controlling a brushless DC motor supplied with power from a power converting unit to convert commercial AC power to polyphase AC power. In the control method, the brushless DC motor is driven through a supply of a non-commutation phase current thereto. A starting time of a phase commutation is monitored using position information of a rotator. A compensation voltage is supplied to the brushless DC motor to minimize torque ripple due to the phase commutation when the phase commutation starts while the phase commutation starting time is monitored. When the phase commutation is complete, the supply of the compensation voltage is stopped.

BRIEF DESCRIPTION OF THE DRAWINGS

These and/or other aspects and advantages of the invention will become apparent and more readily appreciated from the following description of the preferred embodiments, taken in conjunction with the accompanying drawings of which:

FIGS. 8A to 8D are waveform diagrams showing input/output signals of the terminal voltage detecting unit of FIG. 6;

DETAILED DESCRIPTION OF THE PREFERRED EMBODIMENTS

Figure 1:
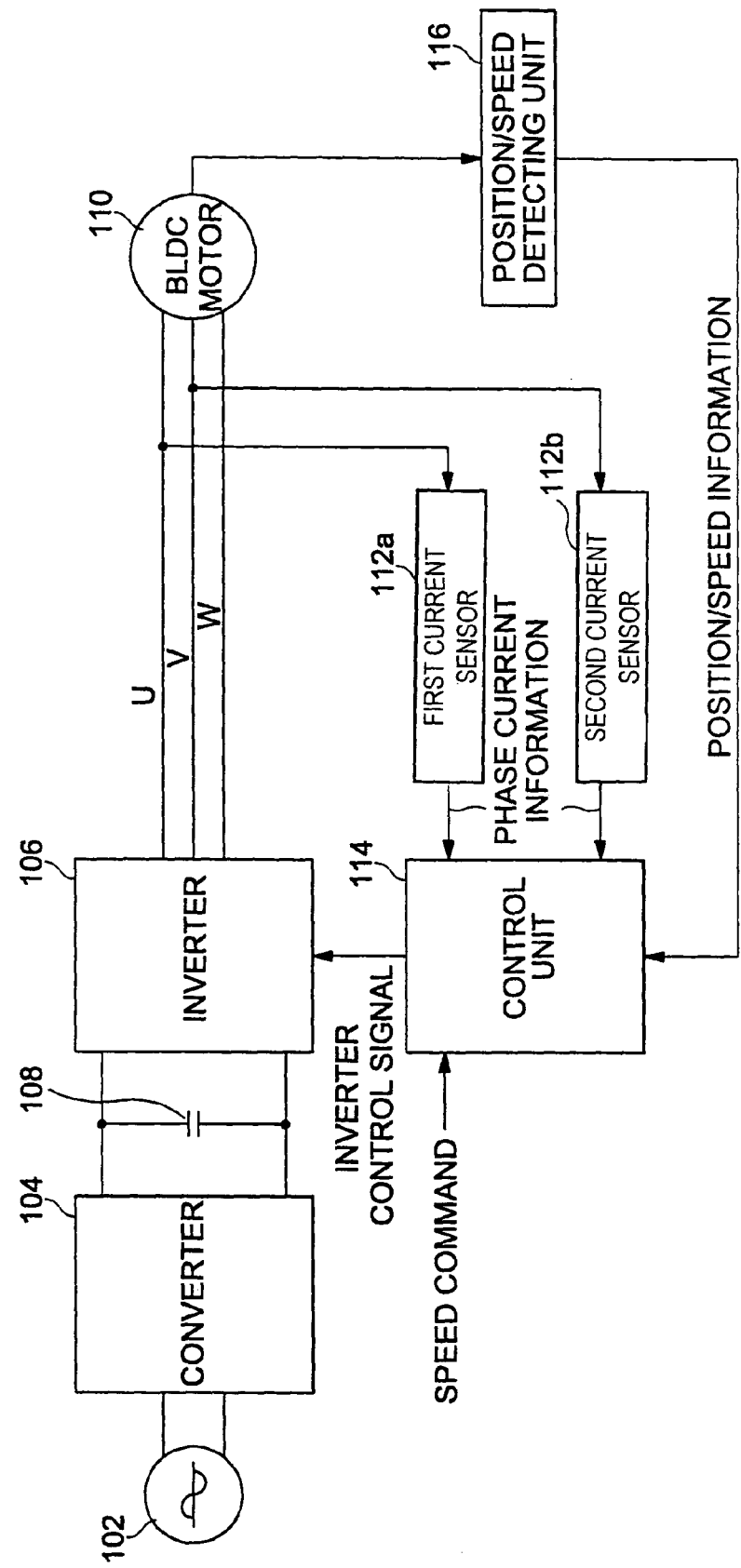
FIG. 1 is a block diagram of a Prior Art apparatus for controlling a brushless DC motor.

Reference will now be made in detail to the present preferred embodiments of the present invention, examples of which are illustrated in the accompanying drawings, wherein like reference numerals refer to like elements throughout.

Figure 2:
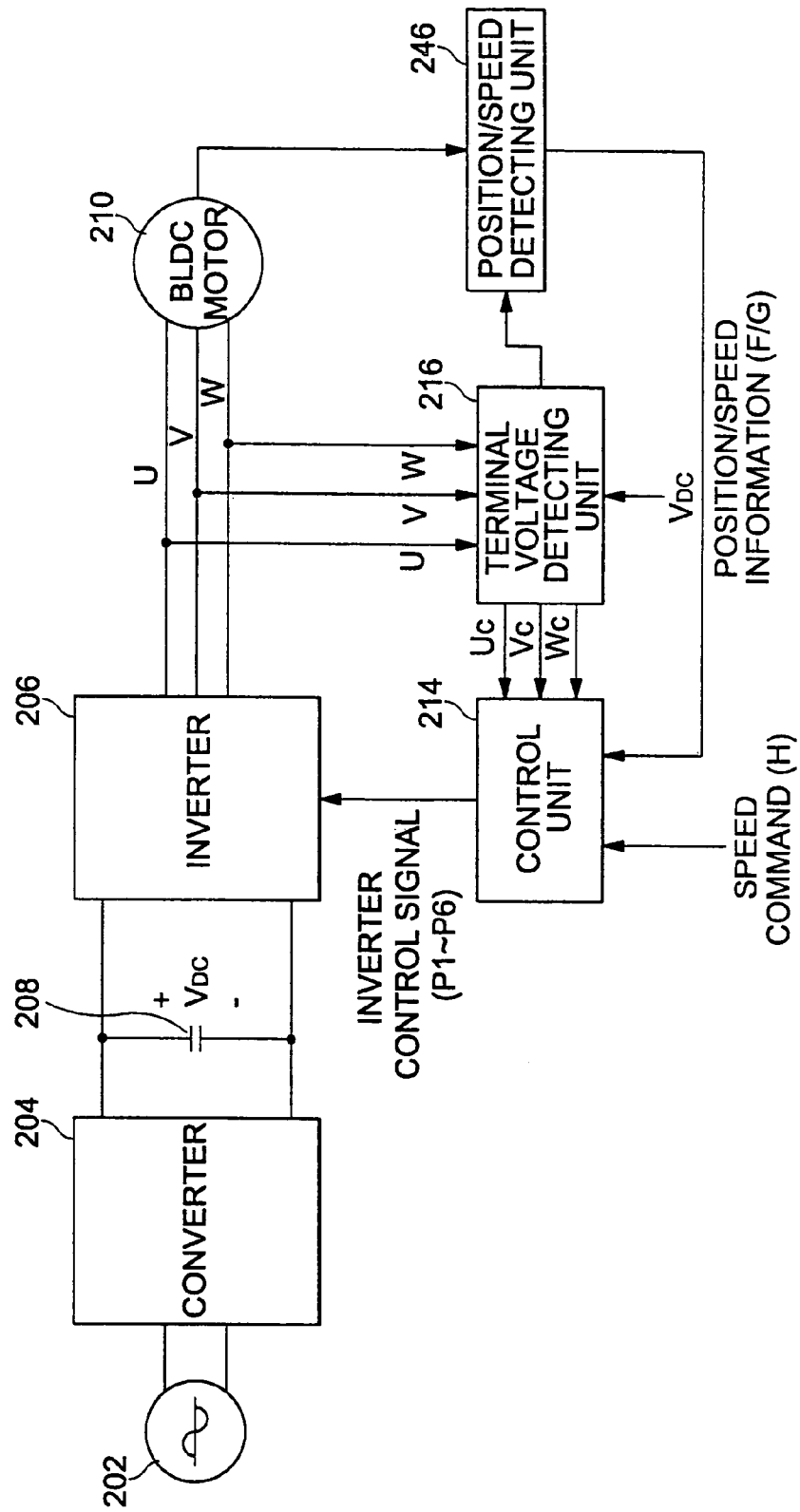
FIG. 2 is a block diagram of an apparatus for controlling a brushless DC motor, according to an embodiment of the present invention.

FIG. 2 is a block diagram of an apparatus for controlling a brushless DC motor according to an embodiment of the present invention. As shown in FIG. 2, a power converting device includes a converter 204, a DC-link capacitor 208 and an inverter 206. The power converting device converts AC power supplied from an AC power supply unit 202 to DC power, converts the DC power to 3-phase AC power, and provides the 3-phase AC power to a brushless DC motor 210. The converter 204 converts the AC power to the DC power, and the inverter 206 converts the DC power to pulse-shaped 3-phase AC power.

A terminal voltage detecting unit 216 detects phase terminal voltages U, V and W of the 3-phase AC power supplied to the brushless DC motor 210 from the inverter 206, and provides terminal voltage information $U_C$, $V_C$ and $W_C$ of the phases to a control unit 214. A position/speed detecting unit 246 obtains position/speed information F/G of a rotator of the brushless DC motor 210, and provides the position/speed information F/G to the control unit 214. The position/speed detecting unit 246 detects a position of the rotator using a position sensor, or phase commutation information of the phase terminal voltages U, V and W supplied to the brushless DC motor 210. The control unit 214 generates inverter control signals P1 to P6 to control a rotation speed of the brushless DC motor 210 with reference to the terminal voltage information $U_C$, $V_C$ and $W_C$ of the 3-phase AC power, provided from the terminal voltage detecting unit 216, and rotator position/speed information F/G of the brushless DC motor 210, provided from the position/speed detecting unit 246. The inverter control signals P1 to P6 generated by the control unit 214 are used to control commutation times and current amounts of respective phases U, V and W of the 3-phase AC power outputted to the brushless DC motor 210 from the inverter 206. The inverter control signals P1 to P6 allow the rotation speed of the brushless DC motor 210 to comply with a speed command H inputted from an outside.

Figure 3:
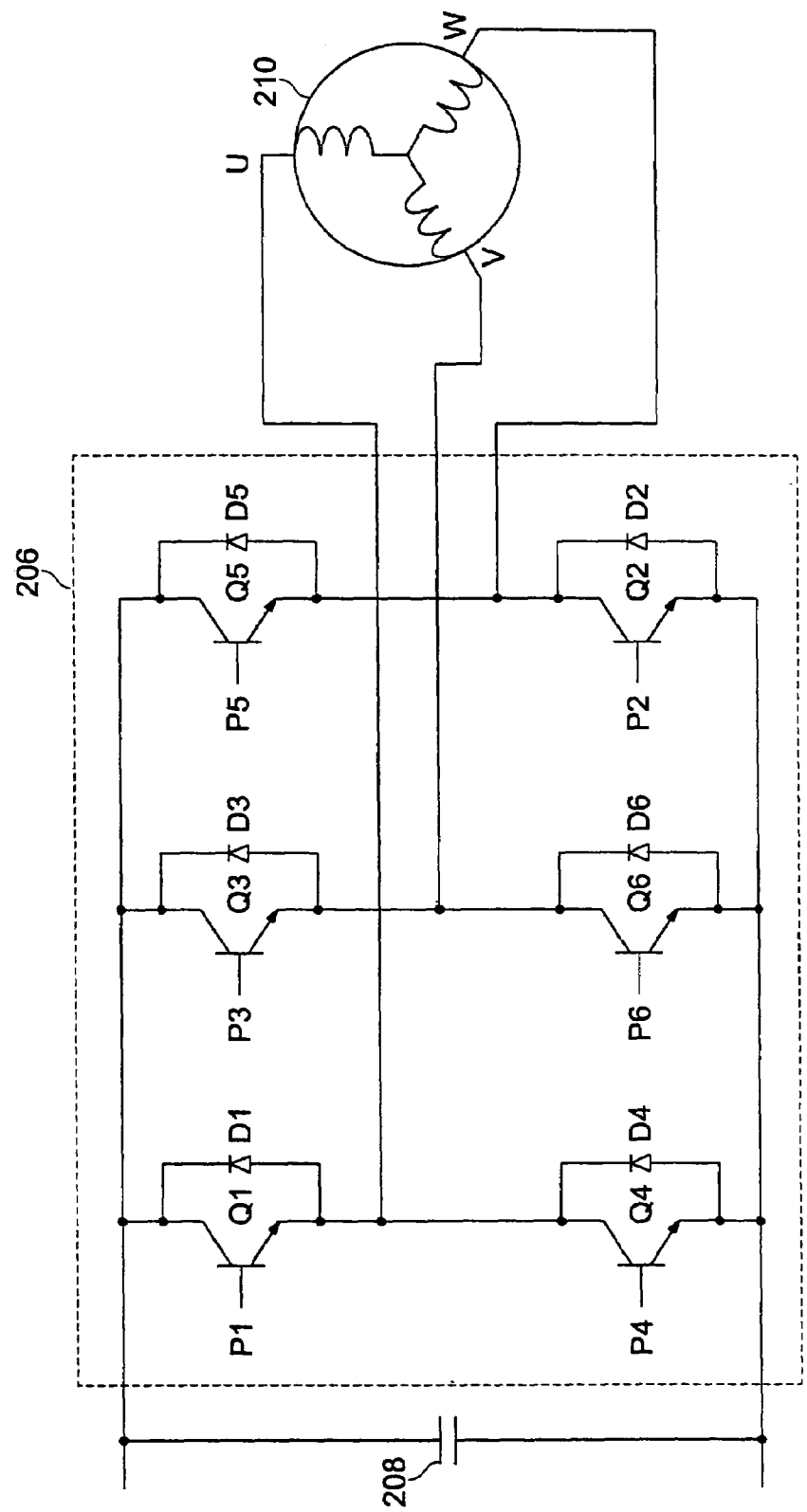
FIG. 3 is a circuit diagram of a 3-phase full-bridge inverter in the brushless DC motor control apparatus of FIG. 2.
Figure 4:
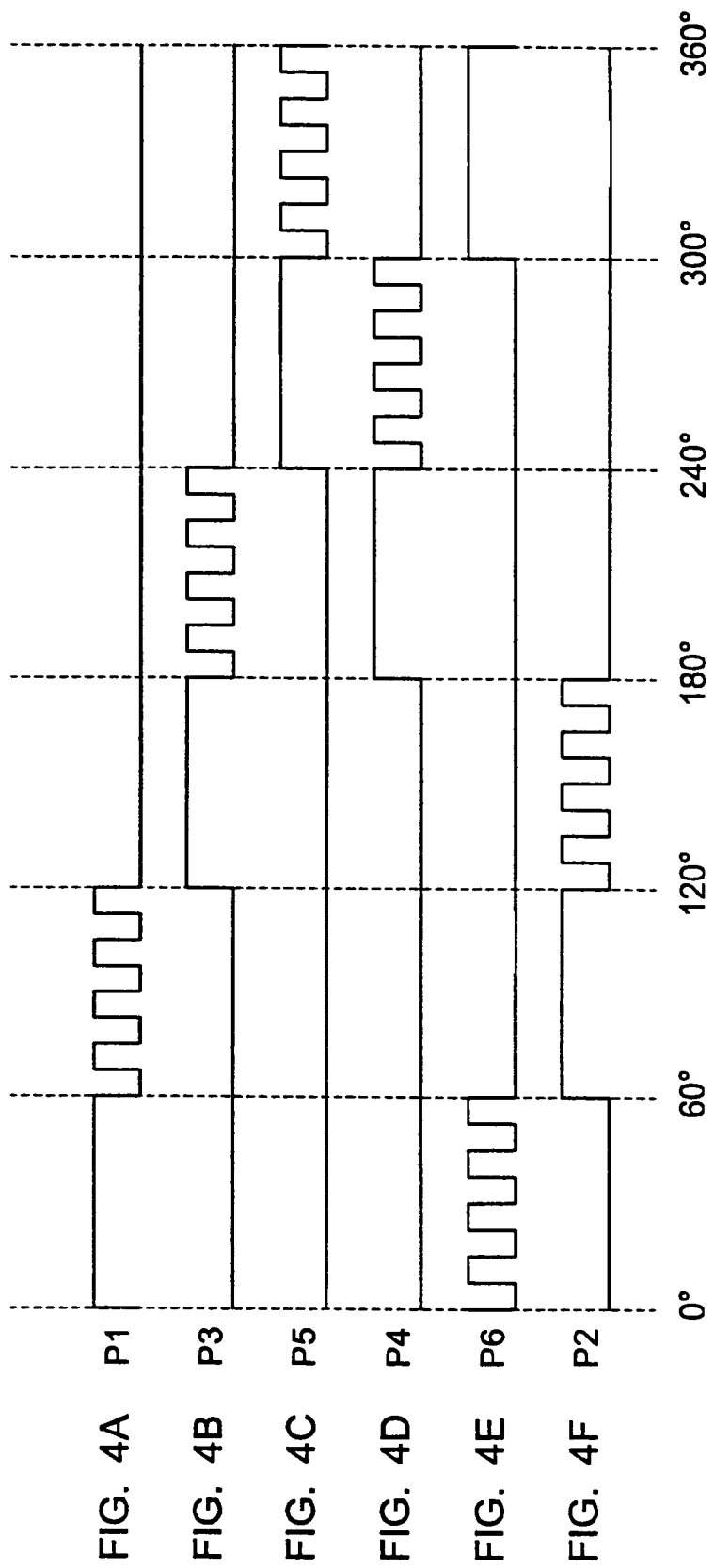
FIGS. 4A to 4F are graphs showing inverter control signals to drive the inverter of the brushless DC motor control apparatus of FIG. 2.

FIG. 3 is a circuit diagram of the 3-phase full-bridge inverter 206 in the brushless DC motor control apparatus of FIG. 2. Referring to FIG. 3, respective switching devices, which are transistors Q1 to Q6, are switched on/off in response to the 3-phase AC signals P1 to P6 each having a 2-phase excitation pattern, which will be described later in FIG. 4, thereby commuting phase currents.

FIGS. 4A to 4F are graphs showing the inverter control signals to drive the inverter 206 in the brushless DC motor control apparatus of FIG. 2. In this case, FIGS. 4A to 4F show the inverter control signals P1 to P6 which are implemented in a form of the 3-phase AC signals each having the 2-phase excitation pattern and used in a rear end unipolar pulse width modulation. In the rear end unipolar pulse width modulation, a pulse width is modulated by a turn-on/off operation of a single switching device in a latter 60° interval (out-going phase) of a 120° conduction period.

Figure 5:
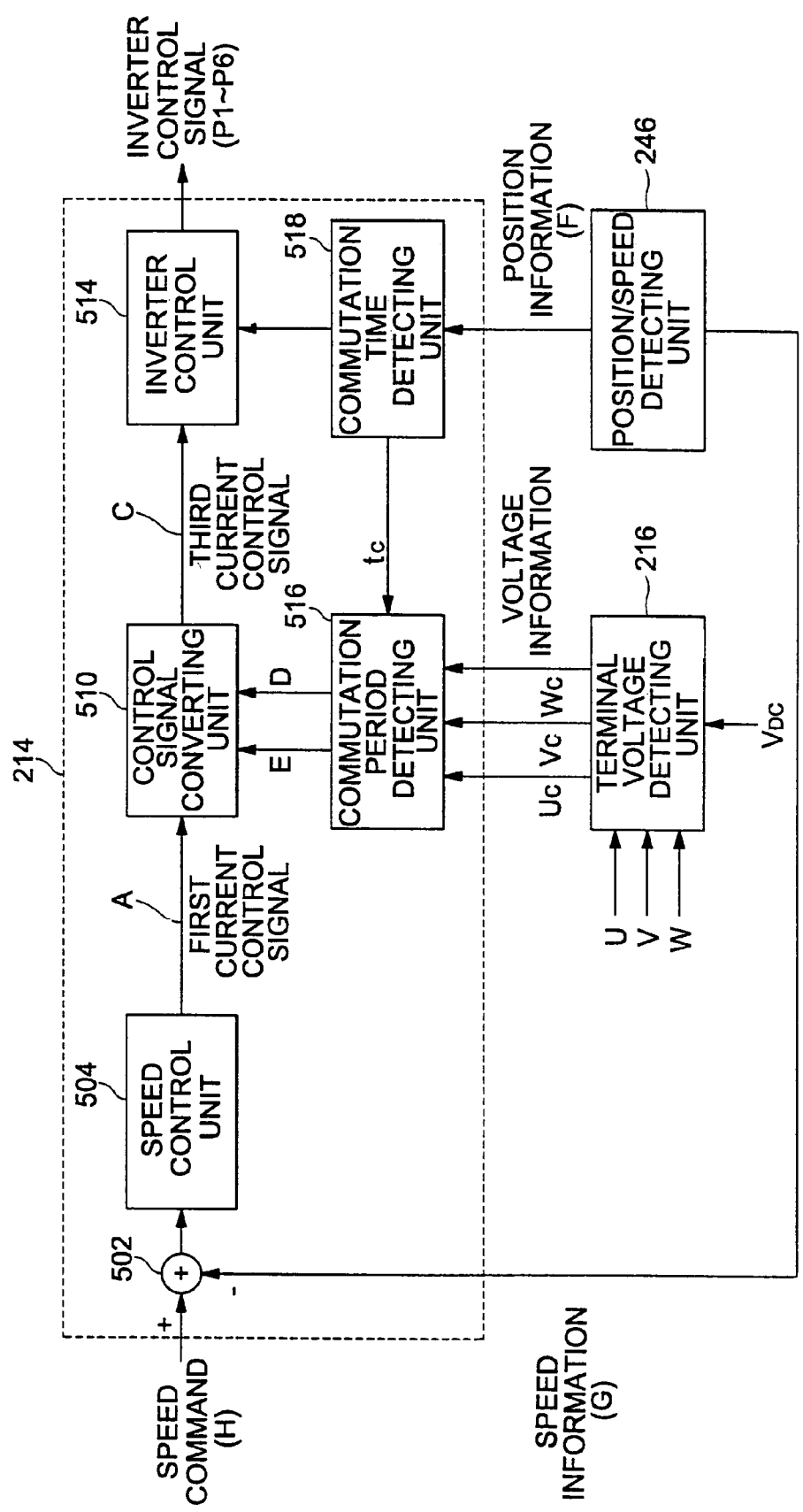
FIG. 5 is a block diagram of a control unit in the brushless DC motor control apparatus of FIG. 2.

FIG. 5 is a block diagram of the control unit 214 in the brushless DC motor control apparatus of FIG. 2. As shown in FIG. 5, an adder 502 arranged at an input end of the control unit 214 calculates a difference between the speed command H provided from the outside and speed information G provided from the position/speed detecting unit 246, and provides the difference to a speed control unit 504. The speed control unit 504 generates a first current control signal A to allow the rotation speed of the brushless DC motor 210 to comply with the speed command H in consideration with the difference between the speed command H and the speed information G. The first current control signal A outputted from the speed control unit 504 is provided to a control signal converting unit 510. The control signal converting unit 510 converts the first current control signal A outputted from the speed control unit 504 to internally generate a second current control signal B (not shown in FIG. 5, refer to FIGS. 8A to 8D). The control signal converting unit 510 selects one of the first current control signal A and the internally generated second current control signal B (not shown), and outputs the selected signal as a third current control signal C. In this case, a selection is performed in response to a commutation period detection signal D provided from a commutation period detecting unit 516.

A commutation time detecting unit 518 detects a time when each phase commutation starts, and provides the detected phase commutation starting time information $t_C$ to the commutation period detecting unit 516. The commutation period detecting unit 516 detects accurate commutation periods using the phase commutation starting time information $t_C$, provided from the commutation time detecting unit 518, and the terminal voltage information $U_C$, $V_C$ and $W_C$ of respective phases, provided from the terminal voltage detecting unit 216, and generates the commutation period detection signal D using the detected commutation period information. That is, the commutation period detection signal D is activated only during the phase commutation periods to allow the control signal converting unit 510 to output the second current control signal B as the third current control signal C. During a 2-phase conduction period, the commutation period detecting signal D is inactivated, so the first current control signal A is outputted as the third current control signal C during the 2-phase conduction period. The third current control signal C, outputted to an inverter control unit 514 from the control signal converting unit 510, determines a time ratio of each of the inverter control signals P1 to P6 having the 2-phase excitation pattern, outputted from the inverter control unit 514.

Figure 6:
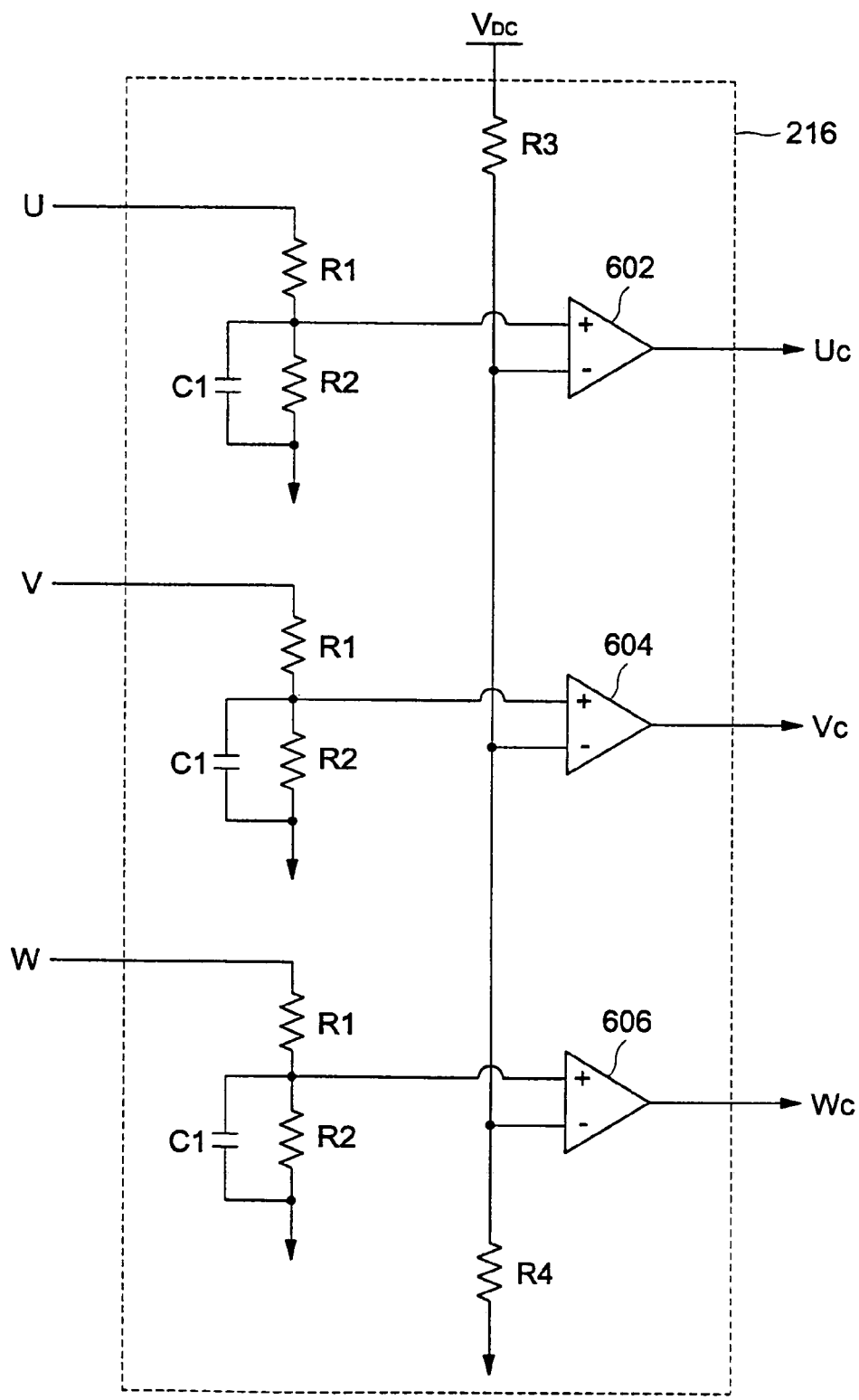
FIG. 6 is a circuit diagram of a terminal voltage detecting unit in the brushless DC motor control apparatus of FIG. 2.

FIG. 6 is a circuit diagram of the terminal voltage detecting unit 216 of FIG. 2. As shown in FIG. 6, the phase terminal voltages U, V and W supplied to the brushless DC motor 210 and a DC-link voltage $V_{DC}$ across ends of the DC-link capacitor 208 are inputted to the terminal voltage detecting unit 216. The phase terminal voltages U, V and W, and the DC-link voltage $V_{DC}$ are each divided in ratios of the resistors R1, R2, R3 and R4 constituting the terminal voltage detecting unit 216, and each pair of corresponding voltages determined as corresponding ratios of the resistors R1, R2, R3 and R4 are compared with each other by respective comparators 602, 604 and 606. The compared results of the pair of corresponding voltages are outputted as the terminal voltage information $U_C$, $V_C$ and $W_C$. That is, each of the phase terminal voltages is compared with, for example, ½ of the DC-link voltage $V_{DC}$ across the ends of the DC-link capacitor 208. If each of the phase terminal voltages is greater than $V_{DC}/2$, each terminal voltage information $U_C$, $V_C$, and $W_C$ is outputted as a "1" state (a high logic level state), while if each of the phase terminal voltages is less than $V_{DC}/2$, each terminal voltage information is outputted as a "0" state (a low logic level state). A principle of obtaining the terminal voltage information $U_C$, $V_C$ and $W_C$ of the respective phases through the comparison of the phase terminal voltages U, V and W with $V_{DC}/2$, and detecting the phase commutation periods using the phase terminal voltage information $U_C$, $V_C$ and $W_C$ is described below.

Figure 7A:
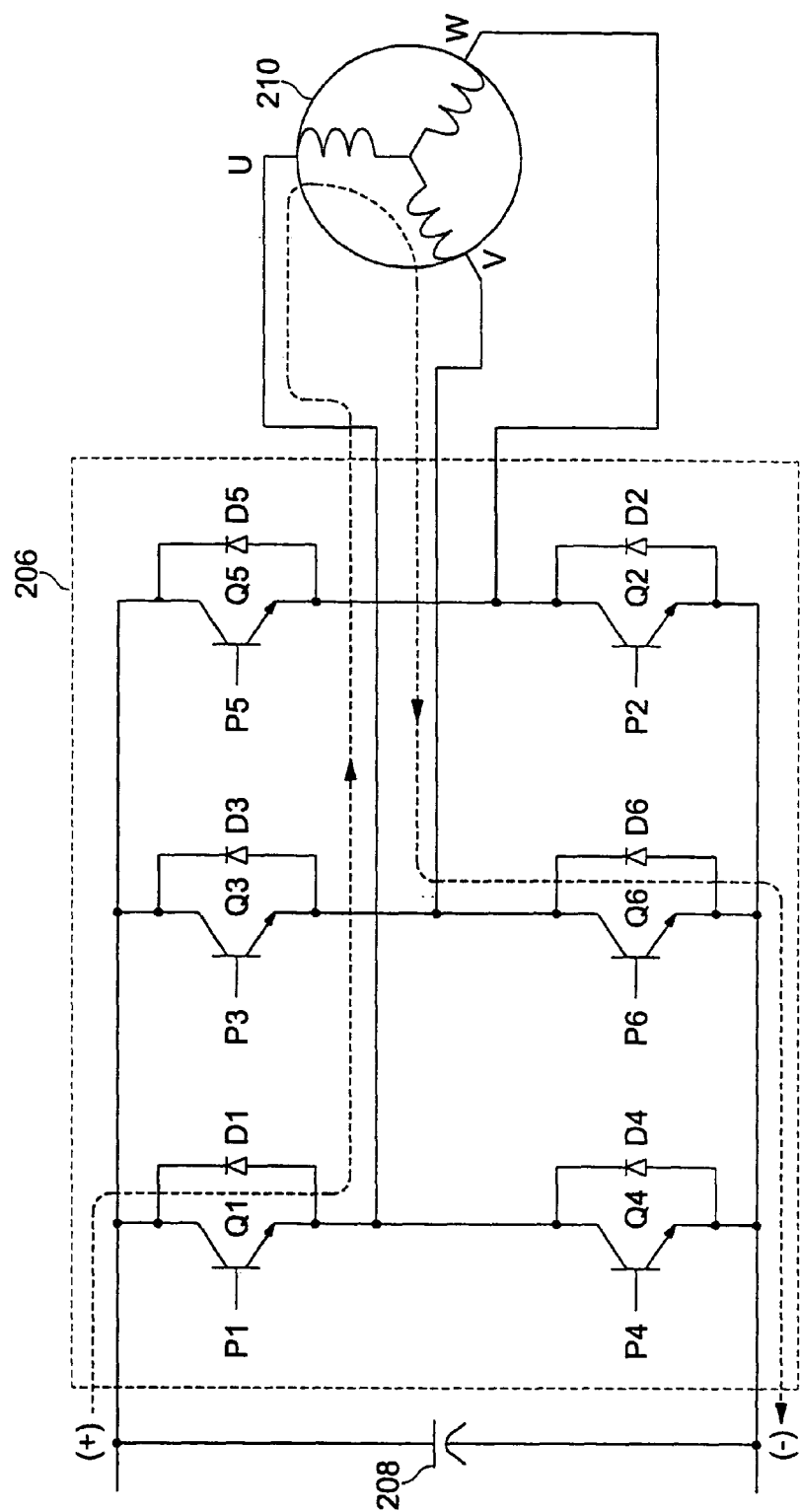
FIGS. 7A to 7C are views showing directions of currents flowing through the inverter of FIG. 3 during a phase commutation period.
Figure 7B:
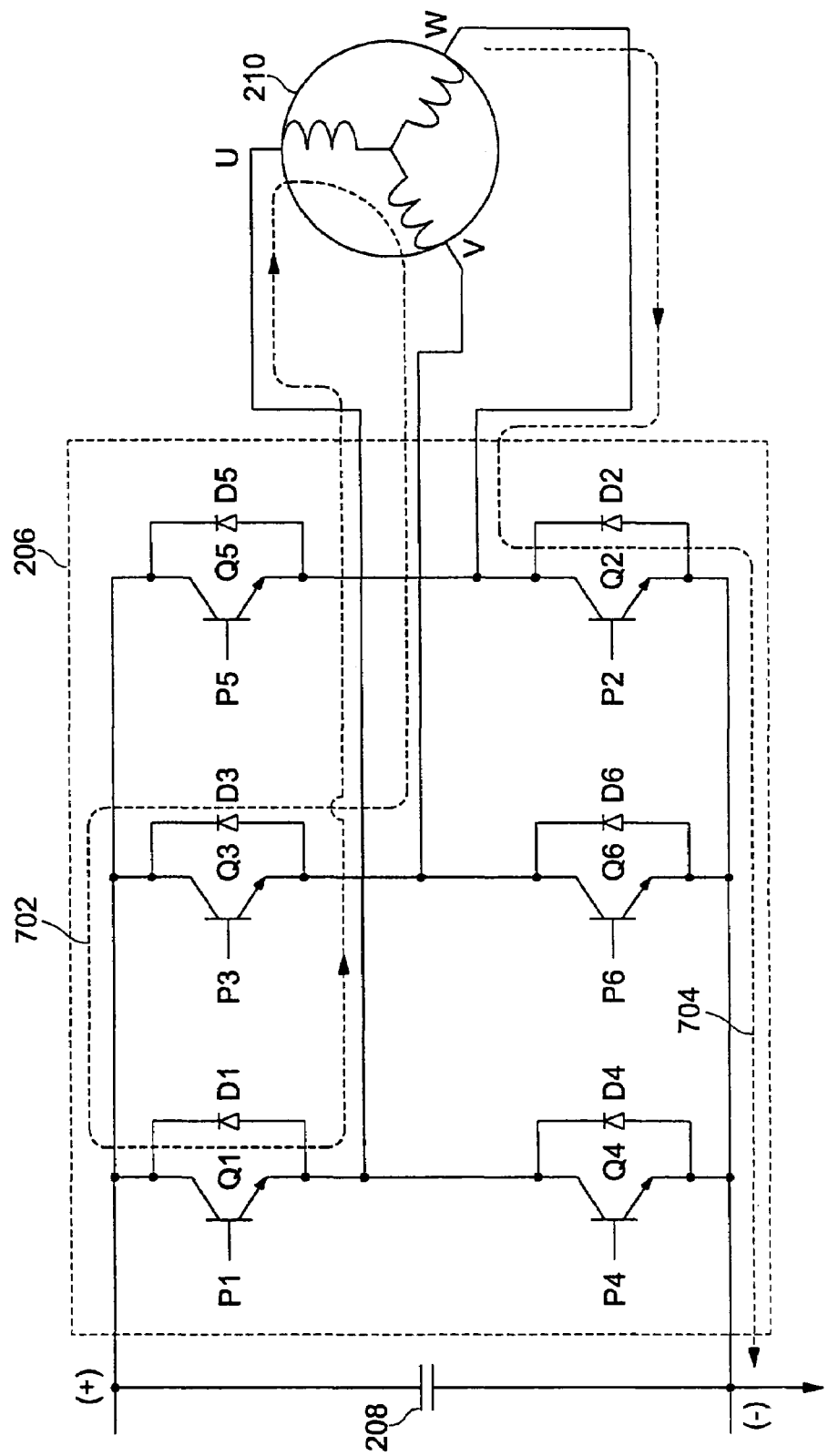
Figure 7C:
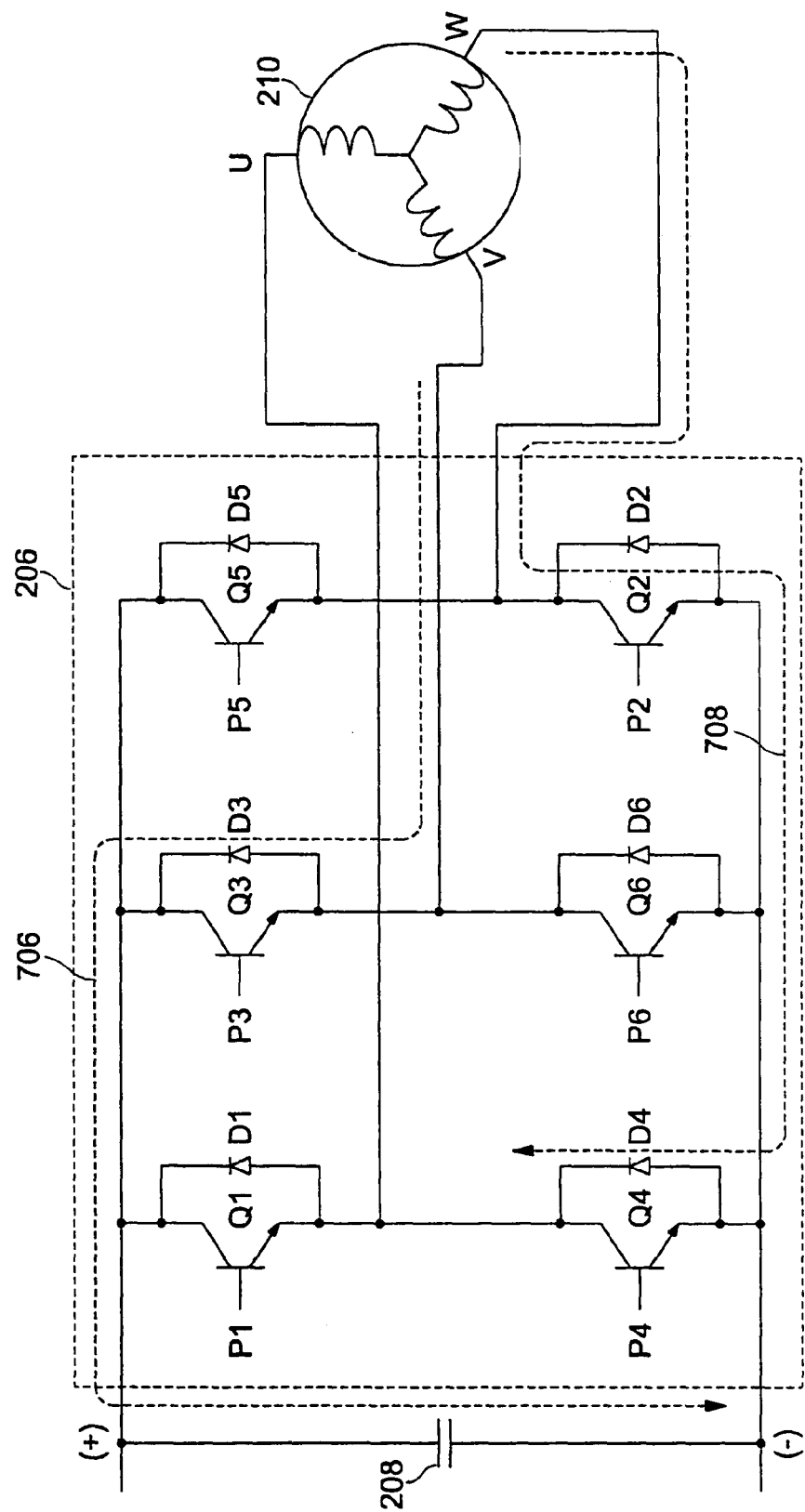

FIGS. 7A to 7C are views showing directions of currents flowing through the inverter 206 during a phase commutation period. FIGS. 7A to 7C illustrate by stages current flows generated during a period in which a U-V phase (0 to 60° interval) is commuted into a U-W phase (60 to 120° interval). In FIG. 7A, a current flow of the inverter 206 in the U-V phase (0 to 60° interval) is depicted. During the 0 to 600 interval, transistors Q1 and Q6 are turned on to allow a U-V phase current to flow through the transistors Q1 and Q6.

In this state, the transistor Q6 is turned off and the transistor Q2 is turned on, so that the phase commutation from the U-V phase to the U-W phase begins, as shown in FIGS. 7B and 7C. FIGS. 7B and 7C illustrate current flows of an extinguished V phase current 702 and an ignited W phase current 704 during a phase commutation period. In FIG. 7B, transistors Q1 and Q2 are turned on, such that the newly ignited W phase current 704 appears on a negative (−) terminal of the DC-link capacitor 208. In FIG. 7C, the transistor Q1 is turned off and the transistor Q2 continues to be turned on. In this case, the extinguished V phase current 106 flows through a diode D3. Therefore, the V phase terminal voltage V has a same intensity (i.e., magnitude or instantaneous value) as that of the DC-link voltage $V_{DC}$ until the extinguished V phase current decreases to "0". After the phase commutation from the V phase to the W phase is complete, the terminal voltage V of the opened V phase terminal is expressed by the following Equations (1), $$V = E_v + \frac{V_{DC}}{2} \quad (Q1 = \text{ON}) \tag{1}$$
$$V = 0 \quad (Q1 = \text{OFF})$$

where $E_V$ is a back electromotive force (EMF) of the V phase. Since an intensity of the back EMF $E_V$ is less than "0" immediately after the phase commutation is complete, the V phase terminal voltage is less than $V_{DC}/2$. That is, the terminal voltage V of the opened V phase terminal is greater than $V_{DC}/2$ during the phase commutation period, and is less than $V_{DC}/2$ after the phase commutation is complete. Therefore, the phase commutation period may be accurately detected by comparing each of the phase terminal voltages with $V_{DC}/2$ using a comparison circuit shown in FIG. 6.

FIGS. 8A to 8D are waveform diagrams showing input/output signals of the terminal voltage detecting unit 216 of FIG. 6 such that respective phase terminal voltages U, V and W are depicted together with the phase terminal voltage information $U_C$, $V_C$ and $W_C$ thereof. As shown in FIGS. 8A to 8D, each phase terminal voltage information $U_C$, $V_C$ and $W_C$ is in a "1" state during intervals in which each of the phase terminal voltages U, V and W is greater than $V_{DC}/2$. Further, each phase terminal voltage information $U_C$, $V_C$ and $W_C$ is in a "0" state during intervals in which each of the phase terminal voltages U, V and W is less than $V_{DC}/2$.

In FIGS. 8A to 8D, three phase commutation times #1, #2 and #3, which represent commutation starting times of the W, V and U phases, respectively, are depicted. As shown in FIGS. 7A to 7C, the terminal voltage of an extinguished phase has the intensity of "0" or $V_{DC}$ until a current of the extinguished phase decreases to "0" after each phase commutation begins. Therefore, a terminal voltage of the phase extinguished immediately after phase commutation takes place is compared with $V_{DC}/2$, and a period in which a compared result is maintained at "1" or "0" is a phase commutation period.

In FIGS. 8A to 8D, after the commutation time #1, the W phase terminal voltage is maintained at $V_{DC}$, whereby an output of the comparator 606 of FIG. 6 is maintained at "1" for a time period $t_W$. The time period $t_W$ is the phase commutation period of the W phase. Further, after the commutation time #2, the V phase terminal voltage is maintained at "0", whereby an output of the comparator 604 is maintained at "0" for a time period $t_V$. The time period $t_V$ is a phase commutation period of the V phase. Similar to this, after the commutation time #3, the U phase terminal voltage is maintained at $V_{DC}$, whereby an output of the comparator 602 is maintained at "1" for a time period $t_U$. The time period $t_U$ is a phase commutation period of the U phase. Therefore, the commutation period detecting unit 516 of FIG. 5 recognizes each phase commutation starting time using the phase commutation starting time information $t_C$ provided from the commutation time detecting unit 518, and allows the control signal converting unit 510 to output the third current control signal C capable of preventing voltage variation due to the phase commutation for time periods $t_U$, $t_V$ and $t_W$, each representing a period from the phase commutation starting time to a completion of the phase commutation, thus minimizing torque ripple generated during the phase commutation periods.

Figure 9:
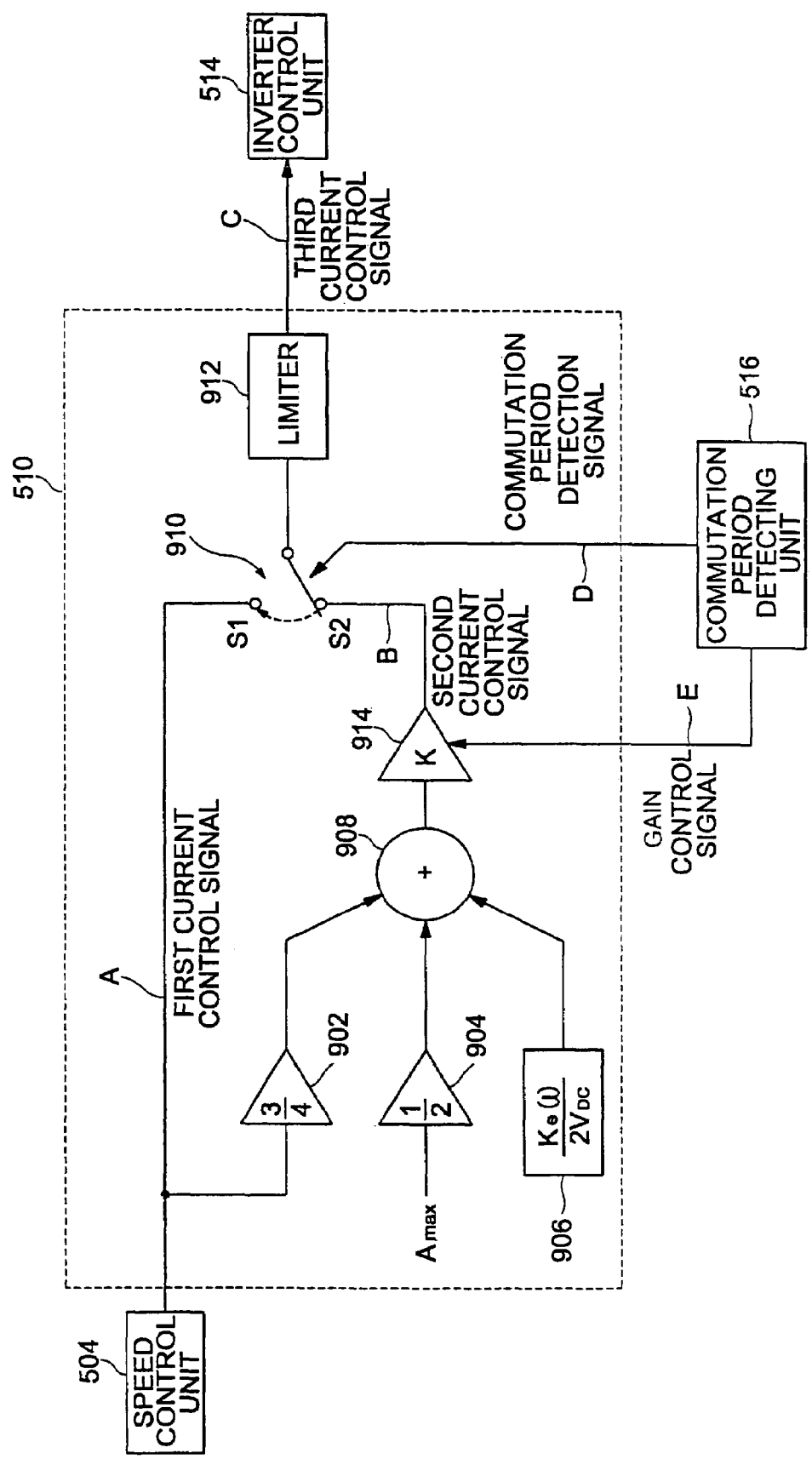
FIG. 9 is a block diagram of a control signal converting unit in the control unit of the brushless DC motor control apparatus of FIG. 5.
Figure 10:
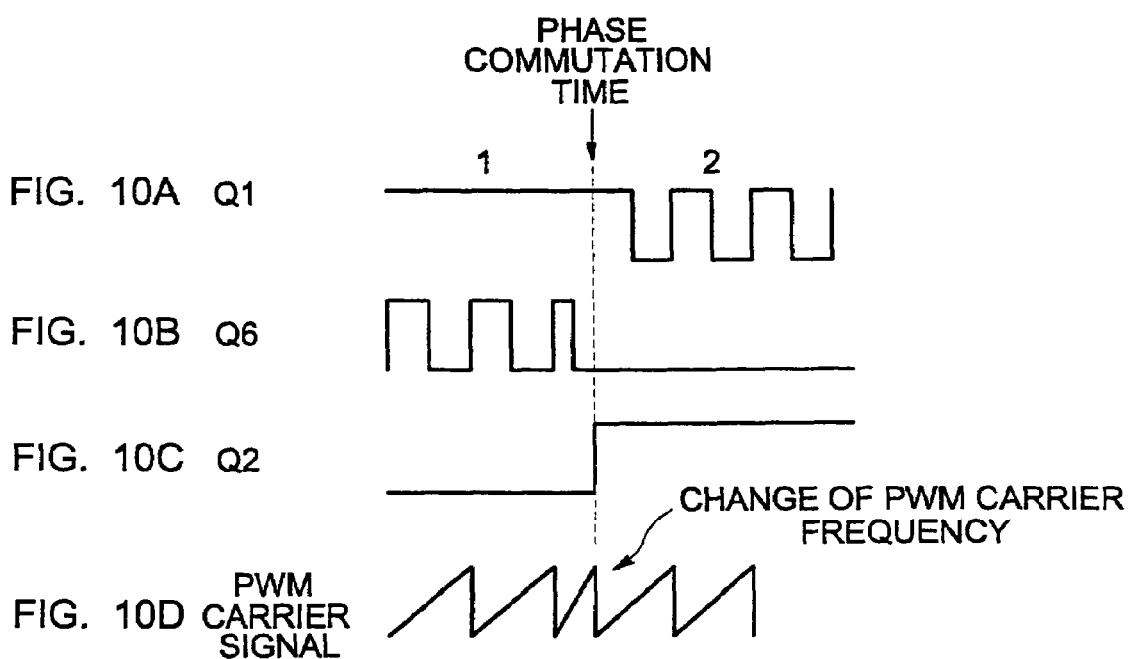
FIGS. 10A to 10D are waveform diagrams showing inverter control signals and a PWM carrier signal of the brushless DC motor control apparatus of FIG. 2.

FIG. 9 is a block diagram of the control signal converting unit 510 of the brushless DC motor control apparatus of FIG.

5. As shown in FIG. 9, the control signal converting unit 510 outputs one of the first current control signal A provided from the speed control unit 504 and the internally generated second current control signal B as the third current control signal C through a switch 910. The second current control signal B is generated through the following process. A first amplifier 902 with a gain of ¾ amplifies the first current control signal A, and provides an amplified result to an adder 908. A second amplifier 904 with a gain of ½ amplifies a signal $A_{MAX}$ which is a maximum intensity of the first current control signal A and provides an amplified result to the adder 908. A signal generator 906 generates a signal $K_e\omega/2V_{DC}$, and provides the signal $K_e\omega/2V_{DC}$ to the adder 908. In this case, $K_e$ is a back electromotive force constant, $\omega$ is a rotation speed of a rotator of the brushless DC motor 210, and $V_{DC}$ is a voltage across the DC-link capacitor 208. The signal added by the adder 908 is variably amplified by a Variable Gain Control (AGC) amplifier 914 to generate the second current control signal B. During a conduction period, a contact point of the switch 910 is connected to a terminal S1, so that the first current control signal A is outputted as the third current control signal C. Further, during the phase commutation period, the contact point of the switch 910 is connected to a terminal S2 by an activated commutation period detection signal D, so that the second current control signal B to compensate for a mean voltage variation generated during the phase commutation period is outputted as the third current control signal C.

A gain K of the AGC amplifier 914 that outputs the second current control signal B is controlled in response to a gain control signal E provided from the commutation period detecting unit 516. The gain K is used to prevent a current ripple due to overcompensation generated when the phase commutation is completed within one cycle of a PWM carrier signal. The gain K has a value between 0 to 1, and the value thereof is determined depending on a ratio of a width of the phase commutation period to a cycle of the PWM carrier signal inputted to the inverter control unit 514. For example, if the cycle of the PWM carrier signal is 250 μs and the width of the phase commutation period is 125 μs, the gain K is 0.5. At this time, the second control current signal B is defined by a value obtained by multiplying a time ratio of each of the inverter control signals P1 to P6 used to control the transistors Q1 to Q6 of the inverter 206 by the gain K. If the cycle of the PWM carrier signal is 250 μs and the width of the phase commutation period is 300 μs, that is, if the phase commutation period is longer than one cycle of the PWM carrier signal, the gain K is 1 during one cycle of the PWM carrier signal immediately after the phase commutation, and the gain K is 0.2 during the next cycle of the PWM carrier signal. In this way, if the phase commutation period is longer than the one cycle of the PWM carrier signal, the commutation period detection signal D controls the switch 910 to output the second current control signal B as the third current control signal C during two cycles of the PWM carrier signal. Generally, the time ratio of each of the inverter control signals P1 to P6 has a value between 0 to 1, so a limiter 912 limits the time ratio of the third current control signal C to a range from 0 to 1.

As described above, to control the time ratio of each of the inverter control signals P1 to P6 is important so as to compensate for the mean voltage variation during the phase commutation period and is described below in detail. First, if the U-V phase is conducting, a mean phase voltage $V_{M1}$ applied to each of conducting U and V phases is defined by the following Equation (2), $$V_{M1} = \frac{V_{DC} \cdot T_1}{2} (0 < T_1 < 1) \quad (2)$$

where $V_{DC}$ is a voltage across the ends of the DC-link capacitor 208 in parallel with the inverter 206, and $T_1$ is a time ratio of the inverter control signal P6 applied to the transistor Q6 of the inverter 206. A mean voltage $V_{M2}$ applied to a non-commutation U phase during a phase commutation period from the U-V phase conduction to a U-W phase conduction is expressed by the following Equation (3), $$V_{M2} = \frac{V_{DC}}{3}(2T_2 - 1) - \frac{E_U + E_V + E_W}{3} (0 < T_2 < 1) \quad (3)$$

where $T_2$ is a time ratio of the inverter control signal P1 applied to the transistor Q1 of the inverter 206 during the phase commutation period from the U-V phase to the U-W phase, and $E_U$, $E_V$ and $E_W$ are back electromotive forces of U, V and W phases, respectively.

As indicated in Equations (2) and (3), if the time ratios $T_1$ and $T_2$ of the inverter control signals P6 and P1 during the 2-phase conduction period and the phase commutation period, respectively, are the same, the mean voltage $V_{M1}$ applied to the non-commutation U phase is temporarily varied to $V_{M2}$ due to the phase commutation. The temporary variation of the mean voltage causes ripple in the non-commutation phase current. Torque of the brushless DC motor 210 is proportional to the non-commutation phase current during the phase commutation interval, so the ripple of the non-commutation phase current due to the phase commutation causes a torque ripple. Therefore, to reduce the torque ripple due to the phase commutation, the time ratio $T_2$ of the inverter control signal P1 provided to the inverter 206 during the phase commutation period is adjusted, as shown in Equation (4), so as to allow a constant current without a current ripple to flow through the non-commutation phase during the phase commutation period, that is, $V_{M1}$ to be $V_{M2}$.

$$T_2 = \frac{1}{2} + \frac{3}{4}T_1 + \frac{E_U + E_V + E_W}{2V_{DC}} \quad (4)$$

Provided that an intensity of each of the back electromotive forces $E_U$, $E_V$ and $E_W$ of U, V and W phases is constant and is proportional to a rotation speed of the brushless DC motor 210 during the phase commutation period, Equation (4) may be simplified as the following Equation (5).

$$T_2 = \frac{1}{2} + \frac{3}{4}T_1 + \frac{K_e \cdot \omega}{2V_{DC}} \quad (5)$$

Consequently, when a 2-phase excitation type brushless DC motor 210 is controlled, the variation of the mean voltage applied to the non-commutation phase during the phase commutation period must be prevented so as to reduce the current ripple due to the phase commutation. For these operations, the time ratio of each of the inverter control signals P1 to P6 must be controlled in accordance with the above Equation (5) simultaneously with the phase commutation. If the time ratio of each of the inverter control signals P1 to P6 is $T_1$ during a 2-phase conduction period, the mean voltage variation of the non-commutation phase may be prevented only when the time ratio thereof is changed to a time ratio $T_2$ simultaneously with a start of the phase commutation and is again changed to a time ratio $T_1$ at a time when the phase commutation is completed (that is, when the phase current of an extinguished phase becomes "0").

If the time ratio thereof is varied to the time ratio $T_1$ from the time ratio $T_2$, in advance, before the phase commutation is complete, a reduction of the mean voltage due to the phase commutation may not be of a sufficient compensation (undercompensation), thus causing the current ripple. If the time ratio thereof is continuously maintained at the time ratio $T_2$ even after the phase commutation is complete, the current ripple is caused due to an overcompensation. Therefore, to minimize the torque ripple due to the phase commutation, the phase commutation period must be accurately detected and the time ratio of each of the inverter control signals P1 to P6 must be maintained at the time ratio $T_2$ only during the phase commutation period.

FIGS. 10A to 10D are waveform diagrams showing the inverter control signals to control transistors $Q_1$, $Q_2$ and $Q_6$ and the PWM carrier signal of the brushless DC motor control apparatus of the embodiment of the present invention. In the case where the control unit 214 of FIG. 5 is used to reduce the torque ripple due to phase commutation, the PWM carrier signal must be synchronized with a turn-on time of a newly ignited switching device, as shown in FIGS. 10A to 10D, otherwise, the mean voltage applied to the non-commutation phase is varied at the turn-on time of the newly ignited switching device, thus causing the current ripple. As shown in FIGS. 10A to 10D, when the frequency of the PWM carrier signal is changed so as to synchronize the PWM carrier signal with the turn-on time of the newly ignited switching device, the time ratio of the PWM carrier signal must be maintained at a constant value by suitably adjusting a turn-on time of a PWM pulse. If only the frequency of the PWM carrier signal is changed while the turn-on time of the PWM pulse is constant, an excessive or insufficient input signal is applied to cause the current ripple. In order to synchronize the PWM carrier signal with an ignition time of a new phase, the carrier frequency of the PWM pulse applied to the extinguished phase may be changed immediately before the phase commutation based on the commutation time, as shown in FIGS. 10A to 10D. Further, a method of changing the carrier frequency of the PWM carrier signal by an angle of 60° may also be used.

Figure 11:
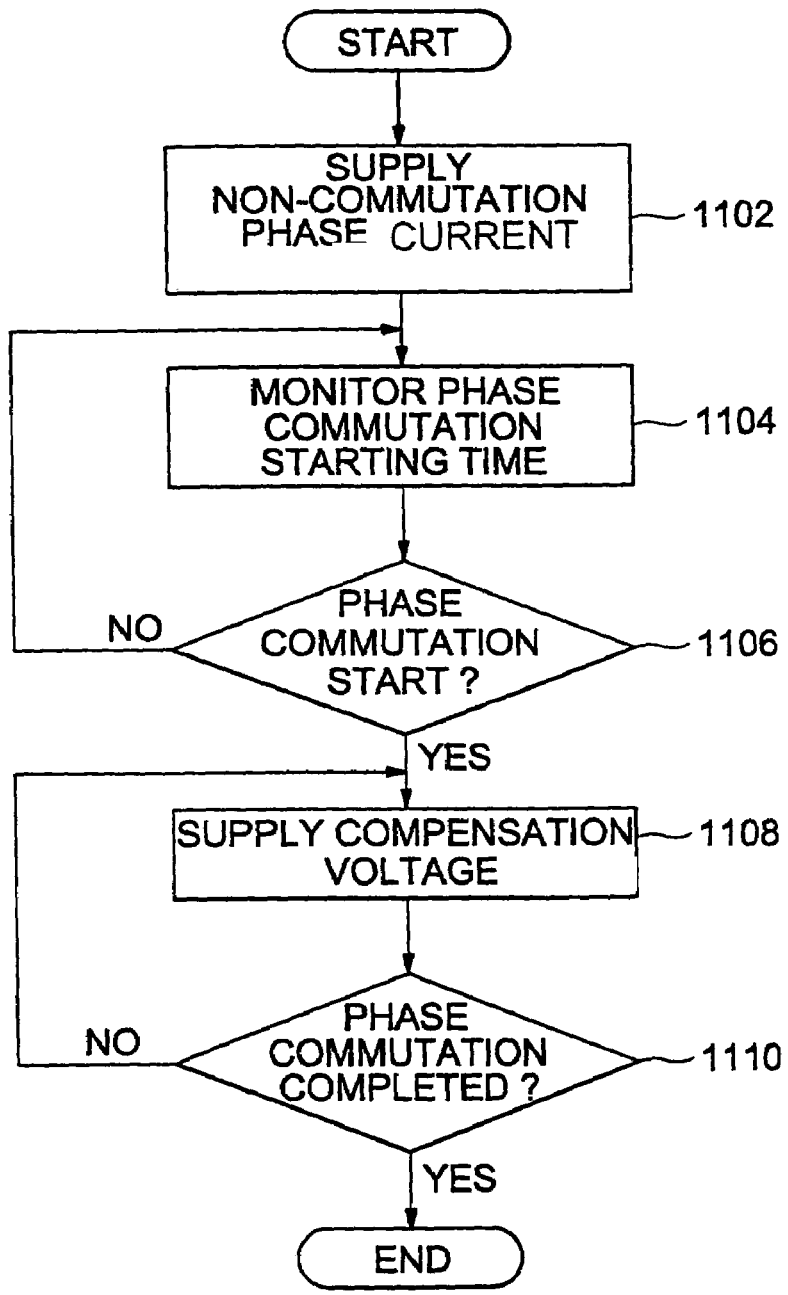
FIG. 11 is a flowchart of a method of controlling the brushless DC motor, according to the embodiment of the present invention.

FIG. 11 is a flowchart of a method of controlling the brushless DC motor according to the embodiment of the present invention. As shown in FIG. 11, a non-commutation phase current is supplied to drive the brushless DC motor 210 at operation 1102. A starting time of a phase commutation is monitored using position information of a rotator at operation 1104. If the phase commutation starts in operation 1106, a compensation voltage is supplied to the brushless DC motor 210 to minimize a torque ripple in operation 1108. If the phase commutation is complete in operation 1110, the supply of the compensation voltage is stopped.

As is apparent from the above description, an apparatus and method for controlling a brushless DC motor is provided, which can accurately detect phase commutation times and phase commutation periods of 3-phase AC power and compensate for a reduction of phase currents occurring during the detected phase commutation periods so as to minimize a torque ripple due to the temporary reduction of phase currents occurring during the phase commutation periods of 3-phase currents supplied to the brushless DC motor.

Although an embodiment of the present invention has been shown and described, it would be appreciated by those skilled in the art that changes may be made in the embodiment without departing from the principles and spirit of the invention, the scope of which is defined in the claims and their equivalents.

What is claimed is:

1. An apparatus for controlling a brushless direct current (DC) motor having a rotator, comprising:
   a power converting unit to convert alternating current (AC) power to polyphase AC power and supply the polyphase AC power to the brushless DC motor;
   a rotator position/speed detecting unit to detect status information of the rotator of the brushless DC motor;
   a terminal voltage detecting unit to detect variations of terminal voltages of the polyphase AC power supplied to the brushless DC motor; and
   a control unit to detect phase commutation periods of the polyphase AC power using the status information of the rotator provided from the rotator position/speed detecting unit and terminal voltage variation information of the polyphase AC power provided from the terminal voltage detecting unit, and to control the power converting unit to supply to the brushless DC motor a compensation voltage used to constantly maintain a mean voltage of a non-commutation phase of the polyphase AC power during the detected phase commutation periods, wherein the control unit comprises:
   a speed control unit to generate a first current control signal providing a non-commutation phase current during non-commutation periods of the polyphase AC power based on a speed command inputted from an outside and current speed information provided from the rotator position/speed detecting unit;
   a commutation period detecting unit to detect the phase commutation periods using the terminal voltage information provided from the terminal voltage detecting unit, and to generate a commutation period detection signal;
   a control signal converting unit to input the first current control signal, to generate a second current control signal, and output one of the first and second current control signals as a third current control signal in response to the commutation period detection signal generated by the phase commutation detecting unit; and
   an inverter control unit to generate one or more inverter control signals each having a time ratio determined in response to the third current control signal outputted from the control signal converting unit.

2. The brushless DC motor control apparatus according to claim 1, wherein the power converting unit comprises:
   a converter to convert the AC power to DC power;
   an inverter to convert the DC power to the polyphase AC power; and
   a DC-link capacitor to connect between the converter and the inverter.

3. The brushless DC motor control apparatus according to claim 1, wherein:
   the terminal voltage detecting unit compares each of the terminal voltages of the polyphase AC power with a reference voltage and generates terminal voltage information, corresponding to each of the terminal voltages, and, respectively, having a first logic level when the respective terminal voltage of the polyphase AC power is greater than the reference voltage, and a second logic level when the respective terminal voltage of the polyphase AC power is less than the reference voltage.

4. The brushless DC motor control apparatus according to claim 3, wherein:
the reference voltage is ½ of a DC-link voltage across the DC-link capacitor; and
the first logic level is greater than ½ of the DC-link voltage, and the second logic level is less than ½ of the DC-link voltage.

5. The brushless DC motor control apparatus according to claim 1, wherein the status information of the rotator detected by the rotator position/speed detecting unit is position and speed information of the rotator.

6. The brushless DC motor control apparatus according to claim 1, wherein the terminal voltage variations detected by the terminal voltage detecting unit are trigger generated in waveforms of the terminal voltages of the polyphase AC power at a time of a phase commutation.

7. The brushless DC motor control apparatus according to claim 6, wherein the control unit calculates the phase commutation periods of the polyphase AC power using a width of the trigger.

8. A method of controlling a rotation of a brushless DC motor, the brushless DC motor being supplied with power from a power converting unit to convert AC power to polyphase AC power, comprising:
driving the brushless DC motor by supplying the polyphase AC power thereto;
monitoring a starting time of a phase commutation using position information of a rotator;
supplying a compensation voltage to the brushless DC motor to constantly maintain a mean voltage of a non-commutation phase of the polyphase AC power to minimize a torque ripple due to the phase commutation when the phase commutation starts; and
detecting an ending time of the phase commutation using information on a time when a trigger of a terminal voltage waveform is generated to stop the supply of the compensation voltage.

9. The brushless DC motor control method according to claim 8, wherein the detecting of the phase commutation ending time comprises:
comparing each of phase voltages of the polyphase AC power with a reference voltage; and
generating terminal voltage information, corresponding to each of the terminal voltages, and, respectively, having a first logic level when a respective terminal voltage of the polyphase AC power is greater than the reference voltage, and having a second logic level when the respective terminal voltage of the polyphase AC power is less than the reference voltage.

10. A method of controlling a rotation of a brushless DC motor, the brushless DC motor being supplied with power from a power converting unit to convert AC power to polyphase AC power, comprising:
driving the brushless DC motor by supplying a non-commutation phase current thereto;
monitoring a starting time of a phase commutation using position information of a rotator;
supplying a compensation voltage to the brushless DC motor to minimize a torque ripple due to the phase commutation when the phase commutation starts; and
detecting an ending time of the phase commutation using information on a time when a trigger of a terminal voltage waveform is generated to stop the supply of the compensation voltage,
wherein the detecting of the phase commutation ending time comprises:
comparing each of phase voltages of the polyphase AC power with a reference voltage; and
generating terminal voltage information, corresponding to each of the terminal voltages, and, respectively, having a first logic level when a respective terminal voltage of the polyphase AC power is greater than the reference voltage, and having a second logic level when the respective terminal voltage of the polyphase AC power is less than the reference voltage, and wherein:
the reference voltage is ½ of a DC-link voltage across a DC-link capacitor; and
the first logic level is greater than ½ of the DC-link voltage, and the second logic level is less than ½ of the DC-link voltage.

11. The brushless DC motor control method according to claim 8, further comprising:
calculating phase commutation periods of the polyphase AC power by using information on times when the trigger is generated.

12. An apparatus for controlling a brushless direct current (DC) motor having a rotator, comprising:
a converting unit to convert alternating current (AC) power to polyphase AC power and to supply the polyphase AC power to the brushless DC motor;
a rotator operation detecting unit to detect operational information of the rotator;
a variation detecting unit to detect variation information of terminal voltages of the polyphase AC power supplied to the brushless DC motor; and
a control unit to detect phase commutation periods of the polyphase AC power using the operational information of the rotator and the variation information of the polyphase AC power supplied to the brushless DC motor and to control a supply of a compensation voltage to the brushless DC motor to maintain a mean voltage of a non-commutation phase of the polyphase AC cower during the detected phase commutation periods,
wherein the control unit comprises:
a speed control unit to generate a first control signal to provide a non-commutation phase current during non-commutation periods of the polyphase AC power based on a speed command inputted from an external source and current speed information provided from the rotator operation detecting unit;
a commutation period detecting unit to detect the phase commutation periods using the variation information of terminal voltages provided from the variation detecting unit and to generate a commutation period detection signal;
a control signal converting unit to input the first control signal, to generate a second control signal, and to output one of the first and second control signals in response to the commutation period detection signal generated by the phase commutation detecting unit; and
an inverter control unit to generate one or more inverter control signals each having a time ratio determined in response to the output from the control signal converting unit.

13. An apparatus for controlling a brushless direct current (DC) motor having a rotator, comprising:
a converting unit to convert alternating current (AC) power to polyphase AC power and to supply the polyphase AC power to the brushless DC motor;

a rotator operation detecting unit to detect operational information of the rotator;

a variation detecting unit to detect variation information of terminal voltages of the polyphase AC power supplied to the brushless DC motor; and a control unit to detect chase commutation periods of the polyphase AC power using the operational information of the rotator and the variation information of the polyphase AC power supplied to the brushless DC motor and to control a supply of a compensation voltage to the brushless DC motor to maintain a mean voltage of a non-commutation phase of the polyphase AC power during the detected phase commutation periods, wherein the compensation voltage is provided only during the phase commutation periods to prevent an under-compensation or an overcompensation of phase currents, and wherein the compensation voltage compensates for a reduction in the phase currents occurring during the phase commutation periods to minimize a torque ripple of the brushless DC motor.

14. The apparatus according to claim 13, wherein the converting unit comprises:

a converter to convert the AC power to DC power;

an inverter to convert the DC power to the polyphase AC power; and a capacitor to connect between the converter and the inverter.

15. The apparatus according to claim 13, wherein:

the variation detecting unit compares each of the terminal voltages of the polyphase AC power with a reference voltage and generates the variation information, corresponding to each of the terminal voltages, and, respectively, having a first logic level when the respective terminal voltage of the polyphase AC power is greater than the reference voltage and having a second logic level when the respective terminal of the polyphase AC power is less than the reference voltage.

16. The apparatus according to claim 15, wherein:

the reference voltage is ½ of a voltage across the capacitor;

the first logic level is greater than ½ of the voltage across the capacitor; and the second logic level is less than ½ of the voltage across the capacitor.

17. The apparatus according to claim 13, wherein the operational information of the rotator is position information and speed information of the rotator.

18. The apparatus according to claim 13, wherein variations in the terminal voltages detected by the variation detecting unit are trigger generated according to waveforms of the terminal voltages of the polyphase AC power at a time of a phase commutation.

19. The apparatus according to claim 13, wherein the rotator operation detecting unit detects position information and speed information of the rotator, as the operational information, by using one of a position sensor and phase commutation information of each of the terminal voltages supplied to the brushless DC motor.

20. The apparatus according to claim 18, wherein the control unit calculates the phase commutation periods of the polyphase AC power using a trigger width.

21. The apparatus according to claim 13, wherein the control unit generates inverter control signals outputted to an inverter to control a rotation speed of the brushless DC motor according to the variation information of the polyphase AC power, provided from the variation detecting unit, and the rotator operation information, provided from the rotator operation detecting unit.

22. The apparatus according to claim 13, wherein the inverter control signals generated by the control unit are used to control commutation times and current amounts of respective phases of the polyphase AC power outputted to the brushless DC motor from the inverter.

23. The apparatus according to claim 13, wherein the inverter control signals allow a rotating speed of the brushless DC motor to comply with a speed command inputted from an external source.

24. The apparatus according to claim 13, wherein the inverter is a full-bridge inverter and comprises:

plural switching devices switched on or switched off in response to the inverter control signals.

25. The apparatus according to claim 24, wherein the plural switching devices are transistors.

26. The apparatus according to claim 13, wherein the inverter control signals provide rear end unipolar pulse width modulation to control the plural switching devices.

27. An apparatus for controlling a brushless direct current (DC) motor having a rotator, comprising:

a converting unit to convert alternating current (AC) power to polyphase AC power and to supply the polyphase AC power to the brushless DC motor;

a rotator operation detecting unit to detect operational information of the rotator;

a variation detecting unit to detect variation information of terminal voltages of the polyphase AC power supplied to the brushless DC motor; and a control unit to detect phase commutation periods of the polyphase AC power using the operational information of the rotator and the variation information of the polyphase AC power supplied to the brushless DC motor and to control a supply of a compensation voltage to the brush less DC motor to maintain a mean voltage of a non-commutation phase of the polyphase AC power during the detected phase commutation periods, wherein the rotator operation detecting unit detects position information and speed information of the rotator, as the operational information, by using one of a position sensor and phase commutation information of each of the terminal voltages supplied to the brushless DC motor, and wherein the control unit comprises:

a speed control unit generating a first current control signal to allow a rotation speed of the rotator of the brushless DC motor to comply with a speed command provided from an external source in accordance with a difference between the speed command provided from the external source and the speed information provided from the rotator operation detecting unit; and a control signal converting unit converting the first current control signal outputted from the speed control unit to generate a second current control signal and selecting one of the first current control signal and the generated second current control signal, and outputting the selected one as a third current control signal.

28. The apparatus according to claim 27, wherein:

the control unit further comprises:

a commutation period detecting unit to detect phase commutation periods using the rotator operation information and outputting a commutation period detection signal; and wherein the selection of the third current control signal by the control signal converting unit is in response to the commutation period detection signal provided from the commutation period detecting unit.

29. The apparatus according to claim 27, wherein the control unit further comprises:
an adder arranged at an input end of the control unit to calculate the difference between the speed command provided from the external source and the speed information provided from the rotator operation detecting unit, and outputs the difference to the speed control unit.

30. The apparatus according to claim 27, wherein the control signal converting unit comprises:
a signal adder;
a first amplifier with a first predetermined gain to amplify the first current control signal and outputting a first amplified signal to the signal adder;
a second amplifier with a second predetermined gain to amplify a first signal and outputs a second amplified signal to the signal adder, the first signal being a maximum intensity of the first current control signal;
a signal generator to generate a second signal according to the rotation speed of the rotator and a voltage across a capacitor;
a variable gain control amplifier variably amplifying the resultant signal from the signal adder to generate the second current control signal; and
a switch selectively switching between the first and second current control signals to output one of the first and second current control signals, as the third current control signal.

31. The apparatus according to claim 30, wherein:
the first predetermined gain is ¾;
the second predetermined gain is ½; and
the second signal is a signal $K_e\omega/2V_{DC}$, where $K_e$ is a back electromotive force constant, $\omega$ is the rotation speed of the rotator of the brushless DC motor, and $V_{DC}$ is the voltage across the capacitor.

32. The apparatus according to claim 30, wherein the switch selectively switches between the first and second current control signals to output the first current control signal, as the third current control signal, during a conduction period and to output the second current control signals, as the third current control signal, during the phase commutation period.

33. The apparatus according to claim 30, wherein the gain of the variable gain control amplifier is controlled in response to a gain control signal provided from the commutation period detecting unit to prevent a current ripple due to an overcompensation generated when the phase commutation is completed within one cycle of a PWM carrier signal.

34. The apparatus according to claim 30, wherein:
the control unit further comprises:
an inverter control unit to generate one or more inverter control signals each having a time ratio determined in response to the third current control signal outputted from the control signal converting unit; and
the gain of the variable gain control amplifier is determined depending on a ratio of a width of the phase commutation period to a cycle of the PWM carrier signal inputted to the inverter control unit.

35. An apparatus for controlling a brushless direct current (DC) motor having a rotator, comprising:
a converting unit to convert alternating current (AC) power to polyphase AC power and to supply the polyphase AC power to the brushless DC motor;
a rotator operation detecting unit to detect operational information of the rotator;
a variation detecting unit to detect variation information of terminal voltages of the polyphase AC power supplied to the brushless DC motor; and
a control unit to detect phase commutation periods of the polyphase AC power using the operational information of the rotator and the variation information of the polyphase AC power supplied to the brushless DC motor and to control a supply of a compensation voltage to the brushless DC motor to maintain a mean voltage of a non-commutation chase of the polyphase AC power during the detected phase commutation periods,
wherein the control unit generates inverter control signals outputted to an inverter to control a rotation speed of the brushless DC motor according to the variation information of the polyphase AC power, provided from the variation detecting unit, and the rotator operation information, provided from the rotator operation detecting unit, and
wherein a torque ripple due to a phase commutation is reduced by adjusting a time ratio of each of the inverter control signals provided to an inverter during the phase commutation period.

36. An apparatus for controlling a brushless direct current (DC) motor having a rotator, comprising:
a converting unit to convert alternating current (AC) power to polyphase AC power and to supply the polyphase AC power to the brushless DC motor;
a rotator operation detecting unit to detect operational information of the rotator;
a variation detecting unit to detect variation information of terminal voltages of the polyphase AC power supplied to the brushless DC motor; and
a control unit to detect phase commutation periods of the polyphase AC power using the operational information of the rotator and the variation information of the polyphase AC power supplied to the brushless DC motor and to control a supply of a compensation voltage to the brush less DC motor to maintain a mean voltage of a non-commutation phase of the polyphase AC power during the detected phase commutation periods,
wherein the control unit generates inverter control signals outputted to an inverter to control a rotation speed of the brushless DC motor according to the variation information of the polyphase AC power, provided from the variation detecting unit, and the rotator operation information, provided from the rotator operation detecting unit, and
wherein the time ratio of each of the inverter control signals is adjusted simultaneously with the phase commutation.

37. The apparatus according to claim 28, wherein the commutation period detecting unit comprises:
a comparison circuit in which phase commutation periods are detected by comparing each of the phase terminal voltages with a reference voltage provided in accordance with a voltage across a capacitor.

38. The apparatus according to claim 24, wherein, when a frequency of a PWM carrier signal is changed so as to synchronize the PWM carrier signal with a turn-on time of a respective one of the plural switching devices, which is newly ignited, a time ratio of the PWM carrier signal is maintained at a constant value by adjusting a turn-on time of a PWM pulse.

39. A method of controlling a brushless DC motor, which is supplied with polyphase AC power, the brushless DC motor having a rotator therein, comprising:

supplying the polyphase AC power to the brushless DC motor;

detecting a starting time of a phase commutation using operational information of the rotator and an ending time of the phase commutation using information on a time when a trigger of a terminal voltage waveform is generated to stop the supply of the compensation voltage, a phase commutation period being defined by the starting and ending times of the phase commutation; and supplying a compensation voltage to the brushless DC motor to substantially eliminate a torque ripple thereof during the phase commutation period, wherein the torque ripple is substantially eliminated by using the compensation voltage to constantly maintain a mean voltage of a non-commutation phase of the polyphase AC power.

40. The method according to claim 39, wherein the detecting of the ending time of the phase commutation comprises:

comparing each of phase voltages of the polyphase AC power with a reference voltage; and generating terminal voltage information for each of the phase voltages having a first logic level when a respective one of the phase voltages of the polyphase AC power is greater than the reference voltage and having a second logic level when the respective one of the phase voltages of the polyphase AC power is less than the reference voltage.

41. The method according to claim 39, further comprising:

calculating phase commutation periods of the polyphase AC power by using information on times when the trigger are generated.

42. The apparatus according to claim 39, wherein the detecting of the operational information of the rotator comprises:

detecting position information and speed information of the rotator by using one of a position sensor and phase commutation information of each of the terminal voltages supplied to the brushless DC motor.

43. The apparatus according to claim 39, wherein the supplying of the compensation voltage comprises:

compensating for a reduction in the phase currents occurring during the phase commutation periods to minimize a torque ripple of the brushless DC motor.

44. An apparatus for controlling a brushless direct current (DC) motor having a rotator, comprising:

a converting unit to convert alternating current (AC) power to polyphase AC power and to supply the polyphase AC power to the brushless DC motor;

a rotator operation detecting unit to detect operational information of the rotator;

a terminal voltage detecting unit to detect variations of terminal voltages of the polyphase AC power supplied to the brushless DC motor;

a variation detecting unit to detect variation information of terminal voltages of the polyphase AC power supplied to the brushless DC motor; and a control unit to detect phase commutation periods of the polyphase AC power using the operational information of the rotator and the variation information of the polyphase AC power supplied to the brushless DC motor and to control a supply of a compensation voltage to the brushless DC motor to substantially eliminate a torque ripple thereof, wherein the control unit comprises:

a speed control unit to generate a first current control signal providing a non-commutation phase current during non-commutation periods of the polyphase AC power based on a speed command inputted from an outside and current speed information provided from the rotator operation detecting unit;

a commutation period detecting unit to detect the phase commutation periods using the terminal voltage information provided from the terminal voltage detecting unit, and to generate a commutation period detection signal;

a control signal converting unit to input the first current control signal, to generate a second current control signal, and output one of the first and second current control signals as a third current control signal in response to the commutation period detection signal generated by the phase commutation detecting unit; and an inverter control unit to generate one or more inverter control signals each having a time ratio determined in response to the third current control signal outputted from the control signal converting unit.

* * * * *

UNITED STATES PATENT AND TRADEMARK OFFICE
CERTIFICATE OF CORRECTION

| | | |
|---|---|---|
| PATENT NO. | : 7,112,936 B2 | Page 1 of 1 |
| APPLICATION NO. | : 10/636540 | |
| DATED | : September 26, 2006 | |
| INVENTOR(S) | : Kwang-Woon Lee | |

It is certified that error appears in the above-identified patent and that said Letters Patent is hereby corrected as shown below:

Column 12, Line 39, change "cower" to --power--.

Column 13, Line 6, change "chase" to --phase--.

Column 14, Line 37, change "brush less" to --brushless--.

Column 16, Line 15, change "chase" to --phase--.

Column 16, Line 44, change "brush less" to --brushless--.

Signed and Sealed this

Thirteenth Day of February, 2007

JON W. DUDAS
*Director of the United States Patent and Trademark Office*